United States Patent [19]

Lindenthal et al.

[11] 4,271,685

[45] Jun. 9, 1981

[54] DOUBLE-RING UNIVERSAL JOINT

[75] Inventors: Hans Lindenthal, Heidenheim; Martin Harz, Steinheim, both of Fed. Rep. of Germany

[73] Assignee: Voith Transmit GmbH, Fed. Rep. of Germany

[21] Appl. No.: 18,232

[22] Filed: Mar. 7, 1979

[30] Foreign Application Priority Data

Mar. 7, 1978 [DE] Fed. Rep. of Germany ....... 2809665
Feb. 21, 1979 [DE] Fed. Rep. of Germany ....... 2906600

[51] Int. Cl.³ .............................................. F16D 3/26
[52] U.S. Cl. ........................................ 64/17 R; 64/18
[58] Field of Search ................................. 64/17 R, 18

[56] References Cited

U.S. PATENT DOCUMENTS

| | | | |
|---|---|---|---|
| 1,394,749 | 10/1921 | Lowndes | 64/17 R |
| 1,656,659 | 1/1928 | Brown | 64/17 R |
| 3,965,700 | 6/1976 | Nicoletti | 64/17 R X |
| 4,075,871 | 2/1978 | Burke | 64/17 R |
| 4,135,372 | 1/1979 | Benson | 64/17 R X |
| 4,166,366 | 9/1979 | Okuda et al. | 64/17 R X |
| 4,192,153 | 3/1980 | Fisher | 64/17 R |

*Primary Examiner*—Henry K. Artis
*Attorney, Agent, or Firm*—Ostrolenk, Faber, Gerb & Soffen

[57] ABSTRACT

The disclosure concerns a universal joint having two joint yokes. There is a ring having two pivot pairs on it with each pivot pair being for the two arms of a respective yoke. A hub is defined centrally of one yoke, and the hub extends through the ring. A telescoping shaft extends through the hub and through the ring and the shaft is connectible to an object to be joined by the joint. The shaft rotates with the hub and its respective one yoke. The other yoke is connectible to the other object that is to be joined by the joint. In a further embodiment there is a series of two of the universal joints. The hub of each joint receives the same common shaft.

28 Claims, 8 Drawing Figures

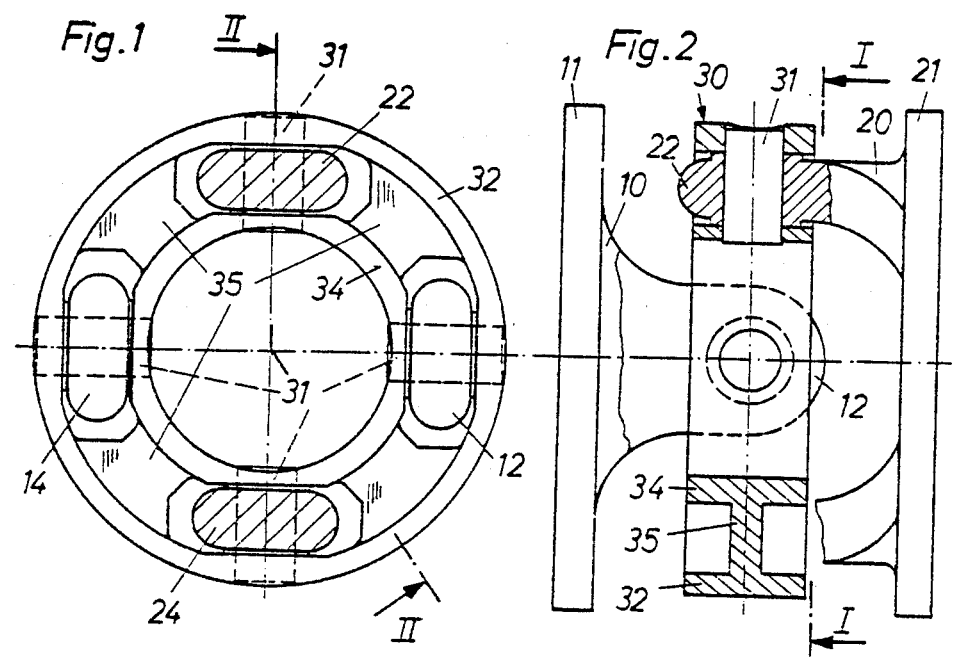
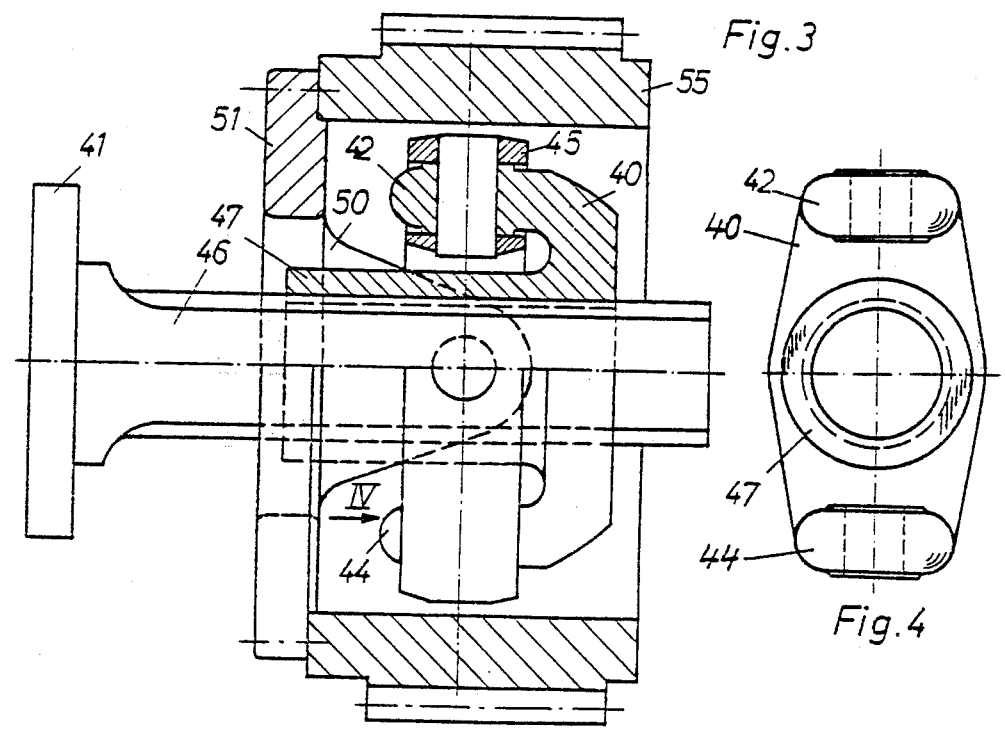

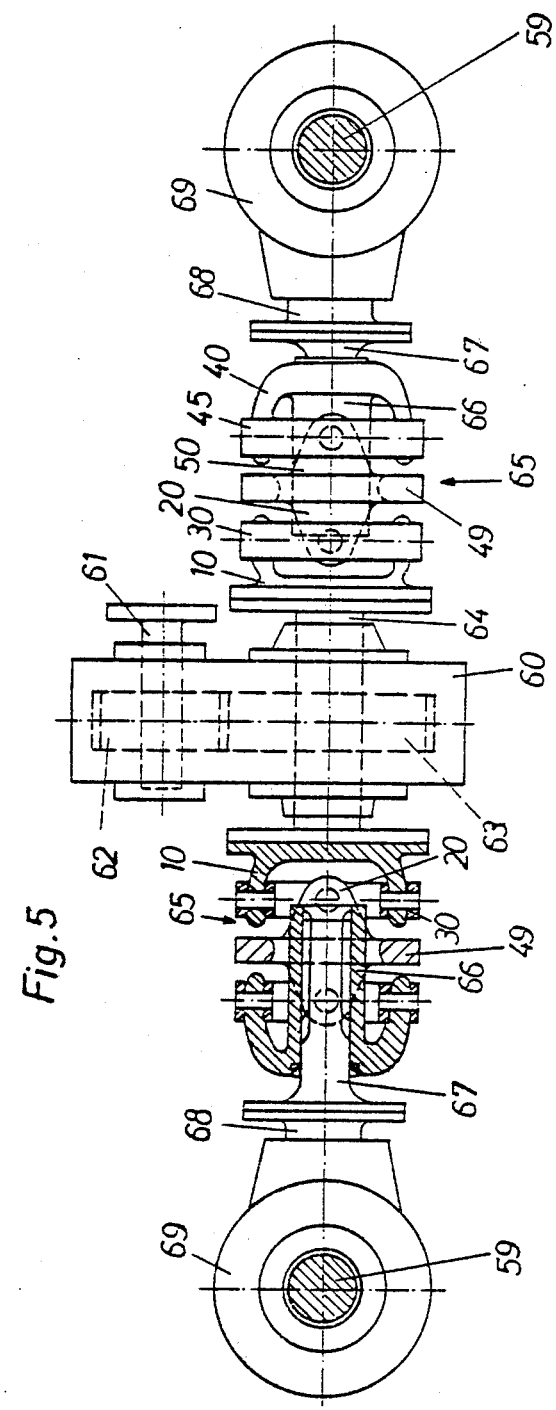

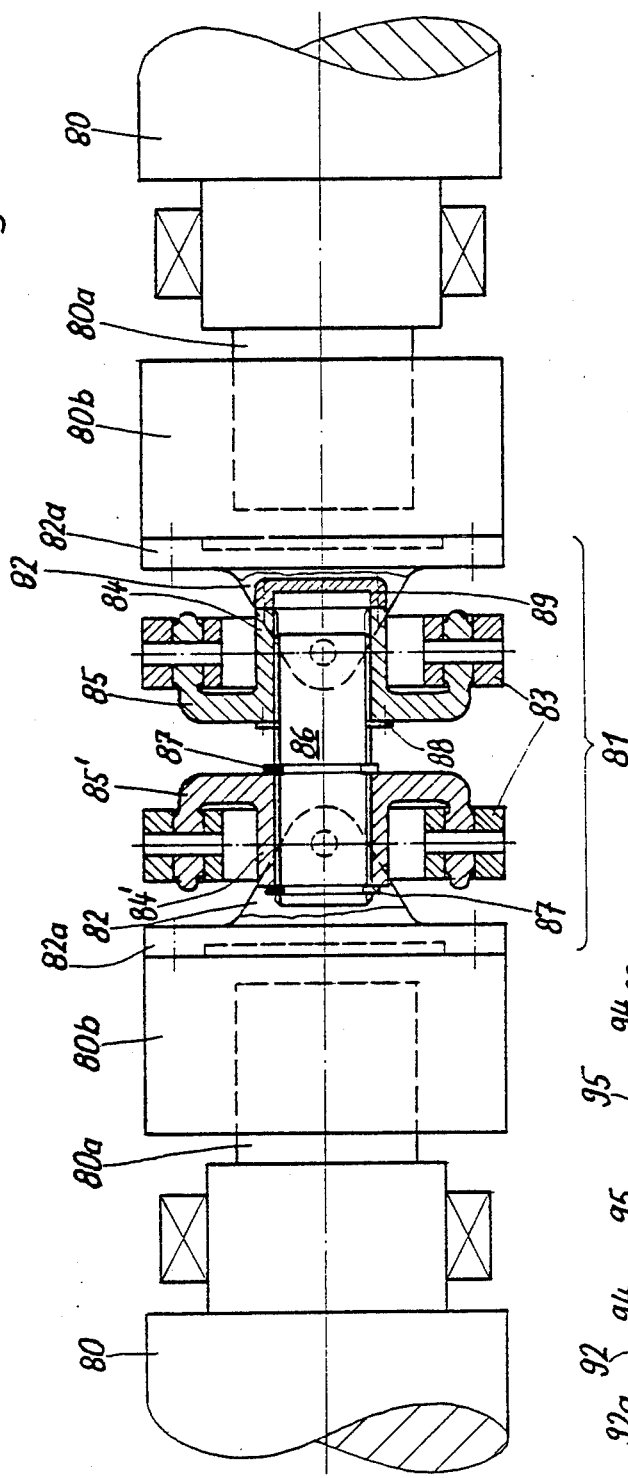
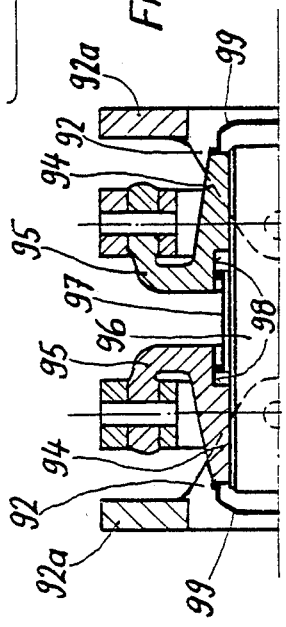

DOUBLE-RING UNIVERSAL JOINT

The present invention realtes to a universal-joint shaft which comprises two universal joint couplings and a telescopic shaft serving for equalization of the length.

The universal joints of this type which are most frequently used have a cross link with four outwardly directed pivots in their universal-joint couplings as intermediate member which produces the articulated connection between the joint yokes. The telescopic shaft is, as a rule, arranged between the two universal joint couplings. The smallest possible overall length of such known universal joint shafts is relatively large so that in various cases when the space available is only slight it is difficult or even impossible to provide such universal joint shafts. Accordingly, it has also been attempted to provide as the intermediate member in universal joint couplings a ring having four outwardly directed pivots. In this way it was desired to make it possible for the shaft portion of the telescopic shaft to pass through the ring in order thereby to achieve a smaller structural length.

In both cases there is the disadvantage that at the intermediate member each pivot forms a cantilever which is subjected to high bending stress upon the transmission of torque. This is frequently the reason why the torque which can be transmitted cannot be increased to a desired value with a given size of coupling. If a ring is used as intermediate member, as indicated above, and accordingly if the space between the yoke ends (in which the pivots are supported) must be increased on the yokes, then there is another disadvantage. It consists in the fact that with high speeds of rotation the yokes expand—to an even greater extent than previously—as a result of the centrifugal force. This has the result that the intermediate member moves eccentrically and thus causes a disagreeable imbalance. Furthermore there is the danger that the pivot bearings will jam in the yoke ends.

The object of the present invention is to provide a universal-joint shaft designed for high power and intended for the driving of rolling mills, rail motor cars or the like, and whose structural length is less than that of the known universal-joint shafts without the above-indicated disadvantages occurring.

One first step of the invention consists in the fact that at least one of the two universal joint couplings is developed as a so-called double-ring universal joint coupling. This means that the intermediate member is developed as a double ring having two ring parts which are arranged concentrically one above the other so that one end of each pivot rests in the one ring part while the other end rests in the other ring part, and so that the bearings provided in the yoke arms for the pivots are arranged between the two ring parts. In this connection the expression "double ring" does not mean that two separate rings must be present. Rather, the double ring will preferably be made in a single piece having four openings which are distributed on its circumference and into which the yoke arms extend.

In itself such a double-ring universal-joint coupling is already known from German Pat. No. 849 631. Its advantages are that the bending stress on the pivots under a given torque is substantially less than in the case of a pivot which is held only at one end. Furthermore, the intermediate member remains at all times accurately centered even at high speeds of rotation, since the yokes of the joint can be deformed by the centrifugal force at most by the amount that the double ring expands under the centrifugal force. The yokes therefore on all four yoke arms remain in contact with the double ring so that an eccentric supporting of the double ring is practically impossible.

Since in the case of such a double-ring universal joint coupling the clear inside diameter of the double ring can be made relatively large as compared with its outside diameter, it is possible, in accordance with the invention, to arrange the hub part of the telescopic shaft within the double-ring universal joint coupling and connect it directly with one of the yokes swingably supported in the double ring. In a universal joint shaft developed in this manner therefore the above-indicated advantages of the double-ring universal joint coupling can be combined with the advantage of a particularly short structural length.

The universal-joint shaft in accordance with the invention is suitable because of its particularly short structural length in particular for the driving of rolling mills in which up to now other angular-movement couplings had to be used because of a lack of space. Furthermore the universal joint shaft of the invention can be advantageously used for transmitting power in the truck of a rail motor car.

The invention will be described in detail below with reference to the drawings in which:

FIG. 1 shows a known double-ring universal joint coupling used in the universal joint shafts of the invention, seen in cross section along the line I—I of FIG. 2;

FIG. 2 shows the universal joint coupling of FIG. 1 partly in elevation and partly in longitudinal section along the line II—II of FIG. 1;

FIG. 3 shows a universal joint shaft in accordance with the invention, seen partially in longitudinal section and partially in side view;

FIG. 4 is a partial view seen in the direction of the arrow IV in FIG. 3.

FIG. 5 shows a part of a vehicle drive with two universal joint shafts in accordance with the invention arranged in the power truck of a rail motor car.

FIG. 7 shows the drive connection between two rolling mill rolls located one behind the other in axial direction, provided with a universal joint shaft in accordance with the invention;

FIG. 8 shows a variant of the universal joint shaft shown in FIG. 7.

Figure 6:
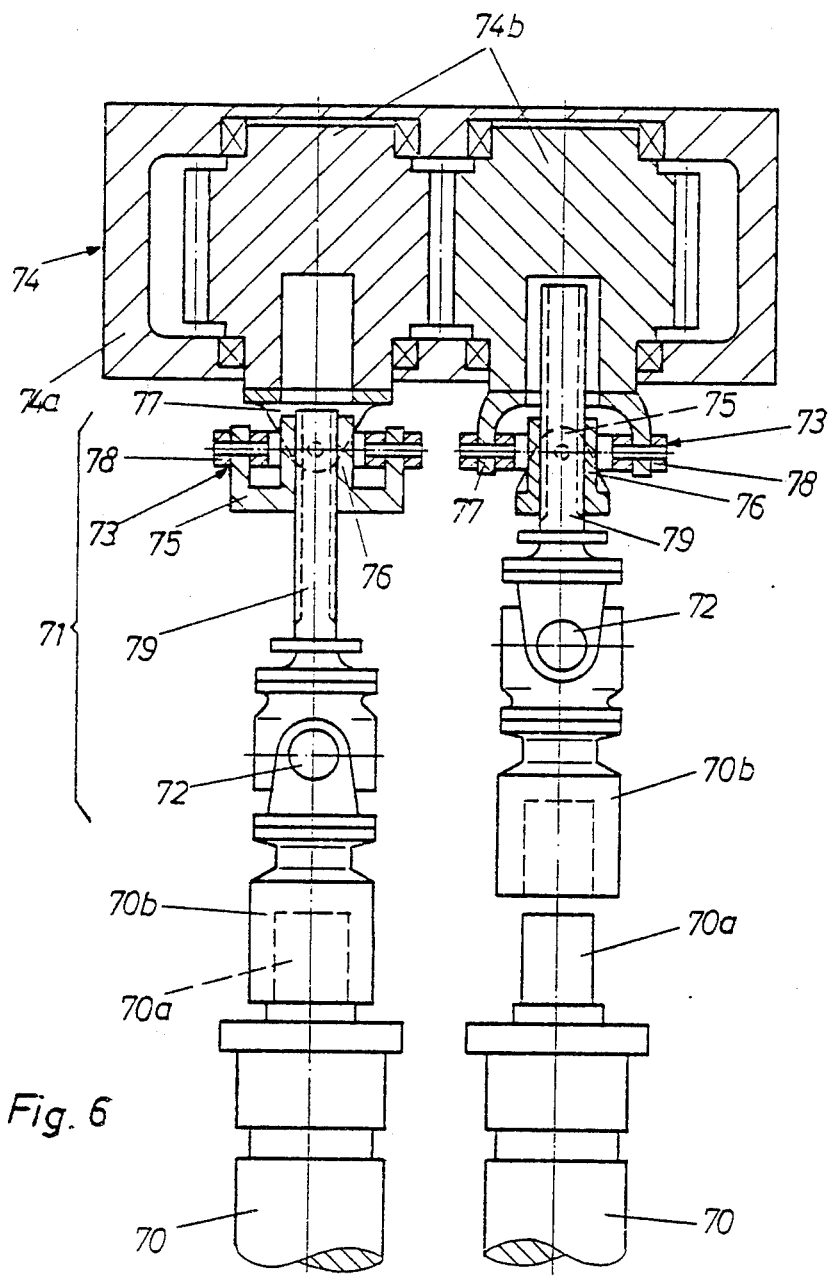
FIG. 6 shows the drive of a vertical rolling mill with two universal-joint shafts in accordance with the invention.

The known universal joint coupling shown in FIGS. 1 and 2 comprises two yokes 10 and 20 and, as intermediate member, a double ring 30 having four pivots 31 on which the yokes are swingably supported. Each yoke has a connecting flange 11 or 21 and two yoke arms 12 and 14 or 22 and 24 respectively. In these yoke arms there can be provided in customary manner anti-friction bearings, including also one thrust bearing each, by which the yokes 10 and 20 and the intermediate member 30 are centered with respect to each other. The said anti-friction bearings are not shown in the drawing.

The double ring 30 which forms the intermediate member has an outer ring part 32 and an inner ring part 34 arranged concentrically within the outer ring part. The two ring parts are connected together by arms 35 to form a self-contained rigid structural part. The yoke arms of the two yokes 10 and 20 extend between the two ring parts 32 and 34 so that each of the pivots 31 serving for the transmission of the power rests at both its ends in the double ring 30.

In order to facilitate the assembling of such a double-ring universal-joint coupling it may be advantageous to split the double ring along the plane determined by the axes of the pivots 31 and connect the two parts of the ring together by bolts.

The arrangement shown in FIG. 3 is part of a universal joint shaft of very short length having a telescopic shaft for length equalization. The universal joint shaft comprising a multi-spline shaft 46 with a connecting flange 41 and a multi-spline hub 47 which is displaceable axially on the multi-spline shaft 46. A yoke 40 is arranged on the hub 47. The two preferably form an integral structural part. The intermediate member 45 is developed as a double ring in the same manner as in the case of the universal joint coupling of FIGS. 1 and 2. The second yoke 50 has an annular connecting flange 51 which is bolted in the example of FIG. 3 to a gear wheel 55. The yoke arms 42 and 44 of the yoke 40 extend from the right-hand end (as seen in the drawing) of the hub towards the rear so that the hub 47 of the telescopic shaft passes centrally through the universal joint coupling 40, 45, 50. In FIG. 3, the universal joint coupling is arranged within the gear wheel 55 which is hollow. In this way the connecting flange 41 can be arranged as desired on one or the other side of the universal joint coupling. In order to develop the device shown in FIG. 3 into a universal joint shaft, another universal joint coupling of any desired construction is attached to the connecting flange 41. FIG. 4 shows the yoke 40 with the hub part 47 in a side view.

FIG. 5 makes it clear how two universal joint shafts developed in accordance with the invention can be arranged in the drive truck of a rail motor car for instance a diesel or electric locomotive for high speeds of travel. In such vehicles there has recently been a demand for an extremely short axial distance between the drive shafts 59. This distance is, for instance, to be only 2.5 m or less. The arrangement comprises a centrally arranged distribution gearing 60 with an input shaft 61, two interengaging gear wheels 62 and 63 and an output shaft 64. Each end of the output shaft 64 is connected via a universal joint shaft 65 with the input shaft 68 of an axle gearing 69. Each of the two universal joint shafts 65 comprises, as seen in the direction of the flow of the force, first of all a universal joint coupling, developed in accordance with FIGS. 1 and 2, having two forks 10 and 20 and a double ring 30 as intermediate member. This is followed by a universal joint coupling which is developed similar to FIG. 3; it has two yokes 40 and 50 and a double ring 45 as intermediate member. The two yokes 20 and 50 have a common annular flange 49 and form a single integral part with the latter. The telescopic shaft, consisting of the multi-spline hub 66 and the multi-spline shaft 67, is arranged concentrically within the two universal joint couplings, resulting in an extremely short structural length. Contrary to the arrangement shown in the drawing, the universal joint shafts 65 could also be installed in opposite manner, the two multi-spine shafts 67 being flanged directly onto the output shaft 64 or forming a single structural part with it.

FIG. 6 shows the upper ends of two rolls 70 of a vertical rolling mill together with their drive journals 70a. On each drive journal there can be placed a so-called wobbler 70b which is connected via a universal joint shaft 71 with a gearing 74. The latter has been shown in simplified manner in the drawing as a gear housing 74a and two gears 74b meshing with each other. Each of the universal joint shafts 71 comprises a lower universal joint coupling 72 which is developed as normal cross-pivot joint having, as intermediate member, a crosspiece, not visible in the drawing, as well as an upper double-ring universal joint coupling 73 developed in accordance with the invention. The main components thereof are—as shown in FIG. 3—a lower yoke 75 which is "grown together" with a multi-spline hub 76, an upper yoke 77 which is flanged onto the gear wheel 74b, and a double ring 78 as intermediate member. For equalization of length a multi-spline shaft 79 is flanged onto the universal joint coupling 72. It cooperates with the multi-spline hub 76 which extends upward through the inside of the double-ring universal joint coupling.

Due to this special development of the universal joint shaft 71 its structural length is very short. Thus it is possible to considerably reduce the distance between the ends of the roll drive journals 70a on the one hand and the gearing 74 on the other hand as compared with arrangements having known universal joint shafts.

FIG. 7 shows how the universal joint shaft of the invention can be further modified in order to obtain an articulated drive connection of extremely short structural length between two rolls 80. The universal joint shaft provided here is designated as a whole by 81. On each of the roll journals 80a there is again placed a wobbler 80b to which a yoke 82 is fastened by means of a flange 82a. Both universal joint couplings of the universal joint shaft 81 have a double ring 83 as intermediate member. Both double rings are identical in shape and size. In addition to this, for further simplification of manufacture, the yokes are also developed as identical pairs. In other words, not only are the abovementioned yokes 82 identical, but essentially the yokes 85,85' which form a unit with the multi-spline hubs 84, 84' are also identical. Both yokes 85,85' rest on a multi-spline shaft 86. In this connection, however, the one yoke 85' is held nondisplaceable in axial direction by means of securing rings 87. (Instead of the securing rings 87 a bolt could also be provided extending transversely through the hub 84' and the multi-spline shaft 86). The other yoke 85 can on the other hand be pushed within the predetermined limits on the multi-spline shaft 86; at one end of its hub 84 it bears a packing ring 88 and on the other end a dust protection cover 89.

The parts 82/82a, 83 as well as 84/85 and 84'/85' are preferably made by drop-forging. However, steel castings can also be used. In each case it is a great advantage that these parts are identical in pairs. In this way only three dies or patterns are required for a given size of universal joint shaft and therefore one die or pattern less than, for instance, in the case of the construction shown in FIG. 5. Since furthermore the multi-spline shaft 86 can be produced by pure machining, i.e. without forging or welding, from bar material, the overall manufacturing cost is kept very low.

As can be noted from FIG. 8, in order to increase the length equalization it can also be provided that both inner yokes 95 are displaceable on the multi-spline shaft 96. The following is provided here for the protection of the multi-spline shaft. The outer ends of the two hubs 94 bear dust protection covers 99. At the inner ends of the hubs 94, widenings 98 of the central borehole are provided. Within same, a protective tube 97 which surrounds the multi-spline shaft 96 can be displaced in sealed manner. Differing herefrom, such a protective tube can be fastened to the one hub and be held displaceably only in the other hub. The outer yokes 92 each have an annular flange 92a into which the dust protection cover 99 can extend. In this way the installed length of the universal joint shaft is unchanged from that of the construction of FIG. 7 although the amount of possible longitudinal displaceability has been increased.

In FIGS. 7 and 8 the yokes 85, 85' and 95 (the "inner" yokes) which form a unit with the hubs 84, 84' and 94 respectively are arranged "back to back," i.e. their yoke arms extend in axial direction from the center of the outer yokes 82 and 92 respectively. This arrangement makes it possible for the yoke arms of the outer yokes 82 and 92 to be made relatively short and for still sufficient space to remain to permit a large angle of swing. However, the inner yokes 85, 85' and 95 can, if only small angles of swing are required, also be placed in opposite manner on the multi-spline shaft 86, 96 respectively; i.e. their fork arms then extend towards the center. In this case a protective tube can be guided on the outer surfaces of the hubs.

We claim:

1. A universal joint subassembly for a shaft comprising:
   a first and a second joint yoke; each said joint yoke including two spaced apart arms;
   an intermediate member, generally in the form of a ring; said intermediate member having an open area defined by the annulus of said ring; said ring having two pairs of pivots defined thereon, with each said pivot pair being defined on a respective axis extending across said intermediate member;
   each said arm of a said yoke being pivotally supported at one said pivot, and the other said arm of the respective said yoke being pivotally supported on the other said pivot of the respective said pair thereof;
   said first yoke including a shaft receiving hub thereon, with a shaft receiving opening defined therein, through which a shaft may be axially moved for being telescoped;
   a shaft in said opening and being axially shiftable with respect to said hub; said shaft being one part of the shaft with which said subassembly is used; said hub and said one shaft part being placed such that said one shaft part extends through said ring open area;
   a second part, with which said universal joint subassembly is used, being connected to said second yoke.

2. The universal joint subassembly of claim 1, wherein each said pivot pair is on an axis perpendicular to the axis of the other said pivot pair.

3. The joint subassembly of claim 1, wherein said first yoke is so shaped that said hub extends through said ring open area.

4. The joint subassembly of claim 1, wherein said intermediate member is in the form of a double concentric ring pair, and each said pivot extends between the said rings of said ring pair and is supported thereby; at said pivots, said yokes having respective bearings that extend between said rings of said ring pair and are received by said pivots.

5. The joint subassembly of claim 1, wherein said second yoke includes an annular flange defined thereon and so placed that said one shaft part extends through said annular flange.

6. The universal joint subassembly of claim 1, wherein said one shaft part is so supported in said shaft receiving opening as to prevent rotation of said one shaft part with respect to said hub while enabling relative axial displacement.

7. The universal joint subassembly of claim 6, wherein said first yoke includes yoke end parts in which bearings for receiving the respective said pivots are positioned; said yoke end parts extending generally axially of said first yoke and then curving inwardly to said hub, for supporting said hub.

8. The universal joint subassembly of claim 6, wherein said second part comprising said second yoke including an annular flange defined thereon and so placed that said one shaft part extends through said annular flange.

9. The universal joint subassembly of claim 6, wherein said first yoke is so shaped that said hub extends through said ring open area.

10. The universal joint subassembly of claim 9, wherein said first yoke includes yoke end parts in which bearings for receiving the respective said pivots are positioned; said yoke end parts extending generally axially of said first yoke and then curving inwardly to said hub, for supporting said hub.

11. The universal joint subassembly of claim 10, wherein said second part comprises said second yoke including an annular flange defined thereon and so placed that said one shaft part extends through said annular flange.

12. A universal joint shaft means, comprising: the universal joint subassembly of any of claims 7, 9 or 10, and a second universal joint subassembly comprising:
    a third and a fourth yoke; each said third and said fourth yoke including two spaced apart arms;
    a second intermediate member, generally in the form of second said ring; said second ring having two pairs of pivots defined thereon, with each said pivot pair being defined on a respective axis extending across said second intermediate member;
    each said arm of said third and said fourth yokes being pivotally supported at one of said pivots on said second intermediate member, and the other said arm of the respective said yoke being pivotally supported on the other said pivot of the respective said pivot pair thereof;
    one of said first and said second yokes being connected to one of said third and said fourth yokes.

13. A universal joint shaft means, comprising:
    the universal joint subassembly of either of claims 1 or 6, and a second universal joint subassembly comprising:
    a third and a fourth yoke; each said third and said fourth yoke including two spaced apart arms;
    a second intermediate member, generally in the form of a second said ring; said second ring having two pair of pivots defined thereon, with each said pivot pair being defined on a respective axis extending across said second intermediate member;
    each said arm of said third and said fourth yokes being pivotally supported at one of said pivots on said second intermediate member, and the other said arm of the respective said yoke being pivotally supported on the other said pivot of the respective said pivot pair thereof;

one of said first and said second yokes being connected to one of said third and said fourth yokes so that the connected said yokes swivel together.

14. A universal joint shaft means of claim 13, wherein it is said second and said third yokes that are rigidly connected.

15. The universal joint shaft means of claim 13, wherein in said second subassembly, each said pivot pair of said second intermediate member is on an axis perpendicular to the axis of the other said pivot pair of said second intermediate member.

16. The universal joint shaft means of claim 15, wherein said second intermediate member is in the form of a double concentric second ring pair, and each said pivot of said second intermediate member extends between the said rings of said second ring pair and is supported thereby; at said pivots therefor, said third and said fourth yokes having respective bearings that extend between said rings of said second ring pair and that are received by said pivots thereof.

17. The universal joint shaft means of claim 16, wherein said third yoke has a respective second shaft receiving hub thereon with a respective shaft receiving opening defined therein, through which a shaft may be axially moved for being telescoped; and both the first of said hubs and said second hub being on said shaft, which is received in common by both said shaft receiving openings in both said hubs and this provides the said connection of one of said first and said second yokes to one of said third and said fourth yokes.

18. The universal joint shaft means of claim 13, wherein said third yoke has a respective second shaft receiving hub thereon with a respective shaft receiving opening defined therein, through which a shaft may be axially moved for being telescoped; and both the first of said hubs and said second hub being on said shaft, which is received in common by both said shaft receiving openings in both said hubs and this provides the said connection of one of said first and said second yokes to one of said third and said fourth yokes.

19. The universal joint shaft means of claim 18, wherein said shaft is so supported in said second shaft receiving opening as to prevent rotation of said shaft with respect to said hub while enabling relative axial displacement.

20. The universal joint shaft means of claim 19, wherein said second intermediate member in the form of a second ring has an open area defined by the annulus of said second ring; said second hub and said shaft being placed such that said shaft extends through said second ring open area.

21. The universal joint shaft means of claim 18, wherein said second hub is rigidly attached to said shaft.

22. The universal joint shaft means of claim 36, wherein said second hub is also connected in a non-rotatable, but axially shiftable manner on said shaft.

23. The universal joint shaft means of claim 18, wherein said third yoke includes respective yoke end parts, in which bearings for receiving the respective said pivots of said second intermediate member are positioned; said yoke end parts of said third yoke extending generally axially of said third yoke and then curving inwardly to said second hub for supporting said second hub.

24. The universal joint shaft means of claim 23, wherein said first and said third yokes are arranged symmetrically with the respective said yoke parts facing axially outwardly with respect to each other along said shaft.

25. The universal joint shaft means of claim 24, further comprising a protective tube on said shaft and located between said hubs for protecting said shaft while permitting relative longitudinal movement of said hubs and on said shaft.

26. The universal joint shaft means of claim 25, further comprising a borehole into at least one said hub and concentric with said shaft into which said protective tube is displaceably shiftable; said borehole having a sidewall therein against which said tube is sealable and said borehole including a widened part further into said borehole, which said protective tube and said sidewall are adapted to seal.

27. The universal joint shaft means of claim 18, further comprising a protective tube on said shaft and located between said hubs for protecting said shaft while permitting relative longitudinal movement of said hubs and on said shaft.

28. The universal joint shaft means of claim 27, further comprising a borehole into at least one said hub and concentric with said shaft into which said protective tube is displaceably shiftable; said borehole having a sidewall therein against which said tube is sealable and said borehole including a widened part further into said borehole, which said protective tube and said sidewall are adapted to seal.

* * * * *